United States Patent
Estrada et al.

(10) Patent No.: US 6,607,242 B2
(45) Date of Patent: Aug. 19, 2003

(54) HEAD RESTRAINT ASSEMBLY

(75) Inventors: Gabriel Estrada, Alamo, TX (US); Mercedes Castelo, San Diego, CA (US); Luis Otero, San Juan, PR (US); Thomas J. Fowler, Clarkston, MI (US); Ernesto E. Blanco, Belmont, MA (US); H. Winston Maue, Northville, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/015,370

(22) Filed: Dec. 12, 2001

(65) Prior Publication Data

US 2002/0093231 A1 Jul. 18, 2002

Related U.S. Application Data

(60) Provisional application No. 60/255,527, filed on Dec. 13, 2000.

(51) Int. Cl.[7] .................................................. B60N 2/42
(52) U.S. Cl. .................. 297/216.12; 297/408; 297/391; 297/216.1
(58) Field of Search ........................ 297/216.12, 216.1, 297/216.13, 216.14, 216.17, 391, 396, 408, 409, 410

(56) References Cited

U.S. PATENT DOCUMENTS

| | | | |
|---|---|---|---|
| 3,027,194 A | 3/1962 | Rumptz | |
| 3,542,428 A | 11/1970 | Colucci | |
| 3,592,508 A | * 7/1971 | Druseikis | 297/380 |
| 4,515,406 A | 5/1985 | Fujiyama et al. | |
| 4,647,108 A | 3/1987 | Hayashi | |
| 4,848,838 A | 7/1989 | McCrackin et al. | |
| 5,118,134 A | 6/1992 | Mattes et al. | |
| 5,181,763 A | 1/1993 | Dellanno et al. | |
| 5,288,129 A | * 2/1994 | Nemoto | 297/410 |
| 5,882,071 A | * 3/1999 | Fohl | 297/216.12 |
| 5,975,637 A | * 11/1999 | Geuss et al. | 297/391 |
| 6,024,378 A | 2/2000 | Fu | |
| 6,042,145 A | 3/2000 | Mitschelen et al. | |
| 6,078,854 A | 6/2000 | Breed et al. | |
| 6,088,640 A | 7/2000 | Breed | |
| 6,290,299 B1 | * 9/2001 | Frisch et al. | 297/410 |
| 6,331,014 B1 | * 12/2001 | Breed | 280/730.1 |
| 6,485,096 B1 | * 11/2002 | Azar et al. | 297/61 |

\* cited by examiner

*Primary Examiner*—Peter M. Cuomo
*Assistant Examiner*—Erika Garrett
(74) *Attorney, Agent, or Firm*—Bill C. Panagos

(57) ABSTRACT

A head restraint assembly includes a curved support member for upwardly and forwardly deploying a headrest. The support member is selectively locked and unlocked to alternately maintain the headrest in a retracted position or deploy the headrest. A vehicle impact sensor signals the release of the support member when a vehicle impact is sensed. The headrest is deployed quickly and effectively until it reaches its potential full deployment, or until an occupant's head contacts the headrest.

22 Claims, 3 Drawing Sheets

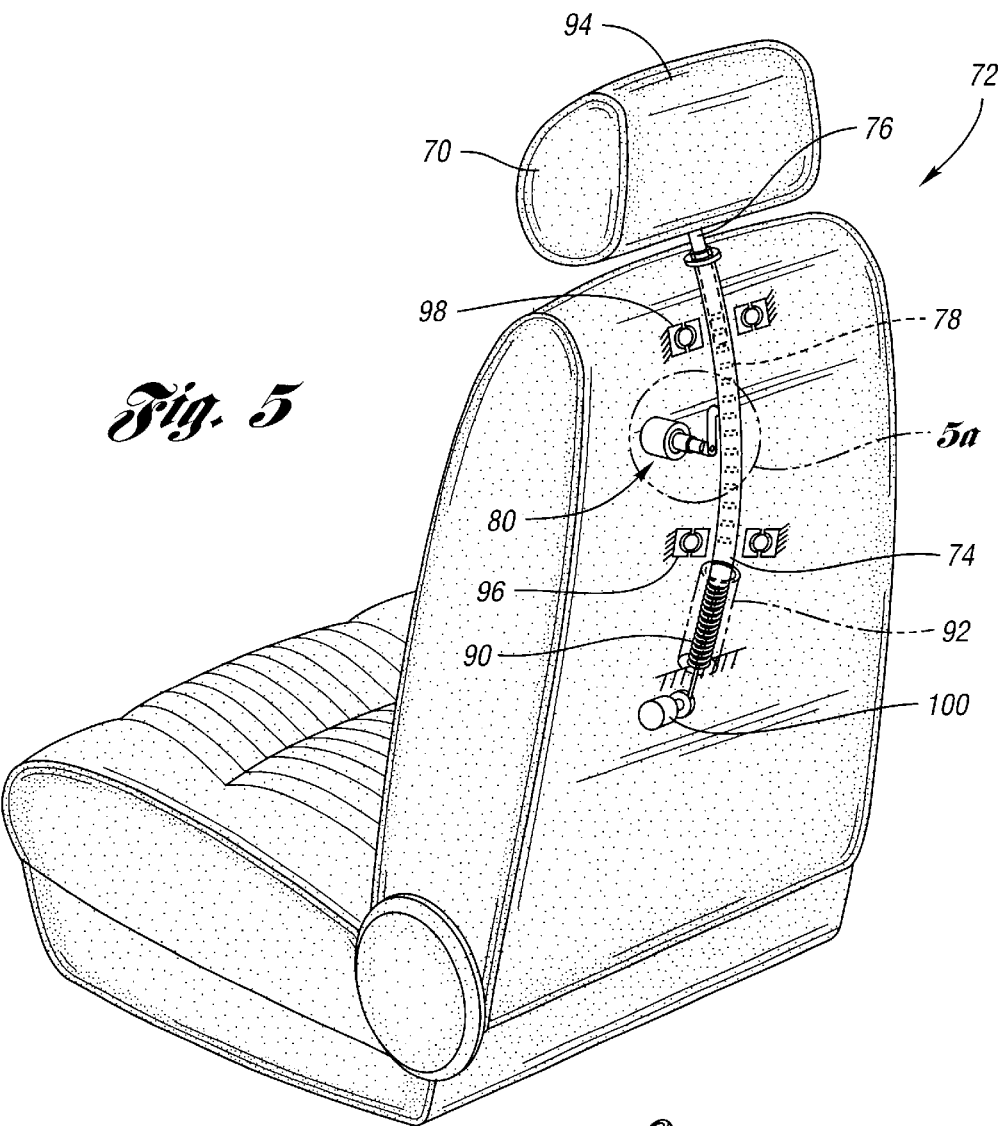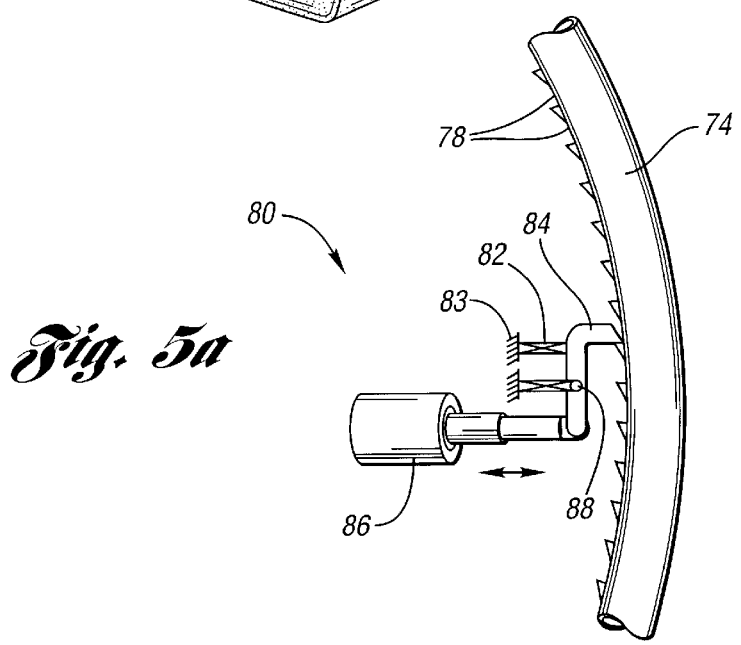

HEAD RESTRAINT ASSEMBLY

CROSS-REFERENCE TO RELATED APPLICATIONS

This application claims the benefit of U.S. provisional application Serial No. 60/255,527 filed Dec. 13, 2000.

BACKGROUND OF THE INVENTION

1. Field of the Invention

The present invention relates to a head restraint assembly including a headrest supported on movable curved tubes which are operative to move the headrest upward and forward in vehicle when actuated in response to a vehicle impact.

2. Background Art

Head restraints used in vehicle seats, manually or automatically adjustable, are well known. The simplest of these devices are headrests which allow the occupant to manually adjust the headrest height to properly support his or her head. The manual adjustment is accomplished either through physically moving the headrest to the desired position, or by means of a motorized system which allows the occupant to electrically control movement of the headrest. The latter system provides the advantage of allowing the occupant to remain seated while the headrest is being adjusted, thereby helping to ensure that the proper headrest height is obtained.

More sophisticated devices include headrests that are connected to sensing devices which are part of an automated adjustment system. In these automated systems, sensors are located in one or more locations throughout the vehicle. The sensors typically detect the presence of an occupant as well as the seated height of the occupant; this information is then sent to a system controller. The controller in turn actuates a drive mechanism which causes the headrest to move vertically, and in some cases horizontally, to the proper position for supporting the occupant's head.

One such device is disclosed in U.S. Pat. No. 6,088,640 issued to Breed on Jul. 11, 2000. Breed teaches a device that includes sensors for detecting the location of an occupant's head and a mechanism for adjusting the headrest either vertically or horizontally as needed. This adjustment can occur continuously, or it can take place just prior to vehicle impact. To accomplish the latter, the system includes a sensor that emits signals from the rear of the vehicle to detect approaching objects. When the sensor signals a controller that a rear impact is about to occur, the controller adjusts the position of the headrest to provide support for the occupant during the anticipated impact. The headrest is adjusted through a series of lead screws that are turned by motors connected to the controller. The disadvantage of this device is that it requires the object sensor to anticipate a future impact so that the motors have time to adjust the headrest prior to the actual impact occurring.

Accordingly, it is desirable to provide a head restraint system for a vehicle that overcomes the shortcomings of prior art systems, by including a headrest that quickly deploys upward and toward the occupant upon vehicle impact, thereby providing support for the occupant's head.

SUMMARY OF THE INVENTION

One aspect of the present invention provides a head restraint system for use in a vehicle seat that includes a headrest that quickly deploys upward and toward the occupant upon vehicle impact so as to provide support for the occupant's head.

Accordingly, a vehicle seat and headrest assembly is provided that comprises a seat back and a headrest that is movably supported with respect to the seat back on a pair of curved guide tubes. The guide tubes are movable along guide elements, and the headrest is movable between a retracted position closely adjacent to the seat back, and an extended position extending away from the seat back and forwardly toward the head of a seated occupant. The headrest has a deployment mechanism for deploying the headrest from the retracted position to the extended position. The headrest also includes a locking device for locking the headrest in a desired vertical position and for disengaging it in the event of a vehicle impact. The disengagement of the locking device allows rapid movement of the headrest to the extended position.

In another aspect of the invention, a vehicle seat and headrest assembly is provided that comprises a seat back and a headrest capable of moving from a retracted position closely adjacent to the seat back, to a deployed position extending away from the seat back and forwardly toward the head of a seated occupant. The headrest is connected to first and second support tubes, which are connected to each other by a brace. The tubes support the headrest and move it between the retracted position and the deployed position. A plurality of guide elements support the tubes and pilot their movement while they move the headrest. A tension spring has one end connected to the brace, and the other end connected to a portion of the seat. The tension spring moves the support tubes to deploy the headrest. The assembly also includes a friction lock for selectively locking the first support tube for stopping movement of the headrest, and releasing the first support tube for facilitating movement of the headrest.

In a further aspect of the invention, a vehicle seat and headrest assembly is provided that comprises a seat back and a headrest capable of being deployed from a retracted position to a deployed position. The headrest is supported by a curved support member which moves the headrest upward and toward the occupant during deployment. A plurality of guide elements carry and pilot movement of the support member during deployment of the headrest. A spring actuated deployment mechanism operates to deploy the headrest. A friction lock has a closed position for locking the support member, thereby stopping deployment of the headrest. The friction lock also has an open position for releasing the support member, thereby facilitating deployment of the headrest. A solenoid is operatively connected to the friction lock for opening and closing it. A vehicle impact sensor signals the solenoid to open the friction lock when a vehicle impact is sensed, and an occupant sensor in the headrest signals the solenoid to close the friction lock when the occupant's head contacts the headrest.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIG. 5 is a schematic view of a head restraint assembly in a vehicle seat in accordance with an alternative embodiment of the invention; and FIG. 5a is a perspective view of the ratchet stopping mechanism used on the head restraint assembly in FIG. 5 to hold the headrest in the retracted position.

DETAILED DESCRIPTION OF THE PREFERRED EMBODIMENT(S)

The present invention provides a headrest which is supported on curved support tubes, and includes a friction lock for locking the headrest in a desired vertical position, as well as a spring which drives the headrest toward a deployed position when the friction lock is unlocked. A motor is provided for returning the headrest to the lowered position.

Figure 1:
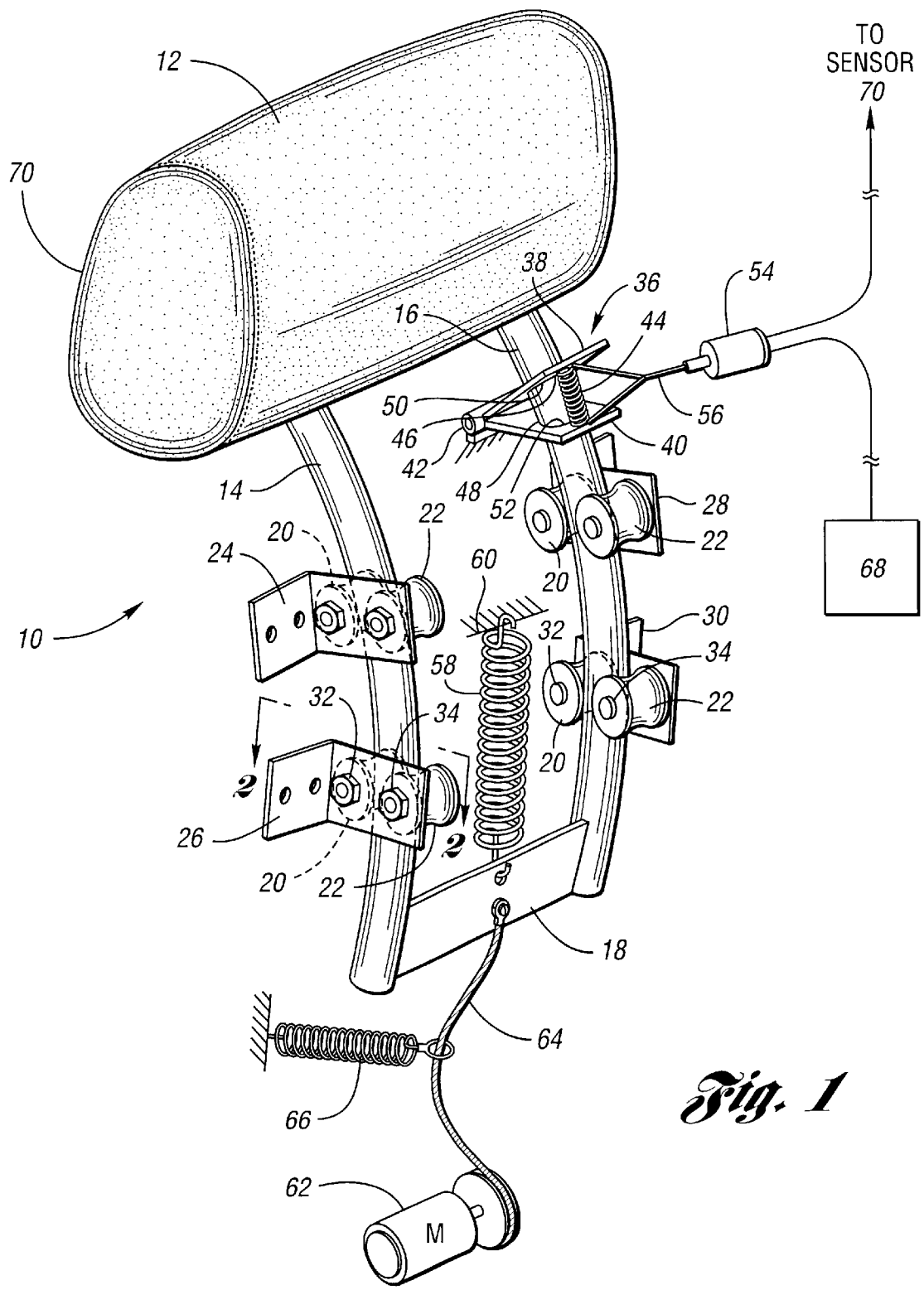
FIG. 1 is a perspective view of a head restraint assembly in accordance with an embodiment of the present invention, shown removed from the vehicle seat for clarity.

As shown in FIG. 1, the head restraint assembly 10 of the present invention includes a headrest 12 which is supported by first and second curved support tubes 14, 16. The curved support tubes are hollow aluminum or steel tubes which are connected together by a brace 18. The curved support tubes 14, 16 are selectively movable along rollers 20, 22, which are supported by the brackets 24, 26, 28, 30. The rollers 20, 22 are preferably made from a reinforced plastic such as Delrin™. Each roller 20, 22 is supported by a pin 32, 34. Accordingly, the curved support tubes 14, 16 are movable along the rollers 20, 22 when the headrest 12 is actuated to the deployed position.

Figure 2:
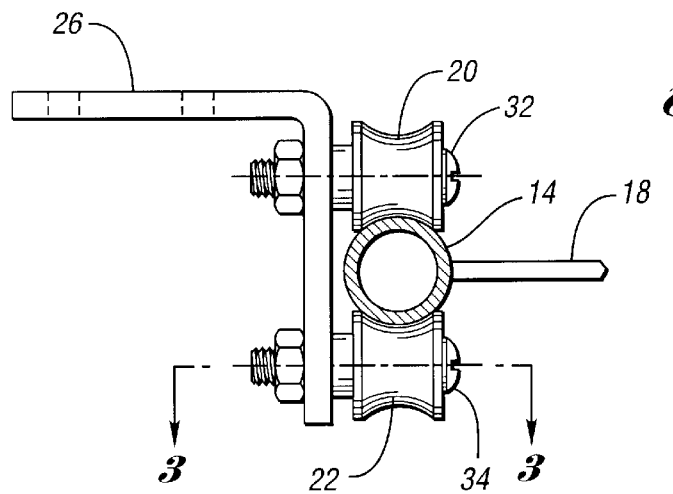
FIG. 2 is a fragmentary sectional view, taken along line 2—2 in FIG. 1, of a portion of the head restraint assembly showing two of the rollers attached to a bracket with one of the curved support tubes disposed between them.
Figure 3:
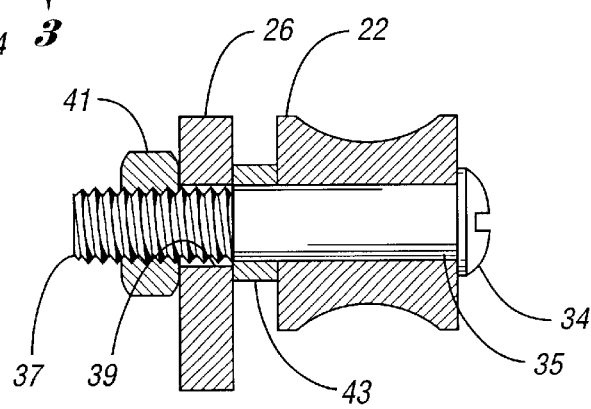
FIG. 3 is a sectional view taken along line 3—3 in FIG. 2, illustrating the attachment of one of the rollers to the bracket.

The rollers 20, 22 are shown in more detail in FIG. 2, which is a fragmentary section taken along line 2—2 in FIG. 1. FIG. 2 illustrates how the tube 14 pilots along the rollers 20, 22, which not only provide support for the tube 14, but also guide the tube 14 as the headrest 12 moves between the retracted and deployed positions. The tube 16 operates with the rollers 20, 22 in similar fashion on the other side of the assembly 10. FIG. 3, taken along line 3—3 in FIG. 2, shows the roller 22 in detail, which attaches to the bracket 26 using the same mechanism as the roller 20. In this embodiment, the pin 34 is a shoulder bolt that is used to facilitate rotation of the roller 22. The shoulder 35 of the pin 34 is axially disposed through the roller 22 and abuts the bracket 26. A threaded portion 37 of the pin 34 traverses an aperture 39 in the bracket 26 and is secured with a nut 41. Thus, the pin 34 is securely fastened to the bracket 26 while the roller 22 is free to rotate on the shoulder 35 of the pin 34. A spacer 43 also rides on the shoulder 35 of the pin 34, and is disposed between the roller 22 and the bracket 26 to limit the axial movement of the roller 22.

Figure 4:
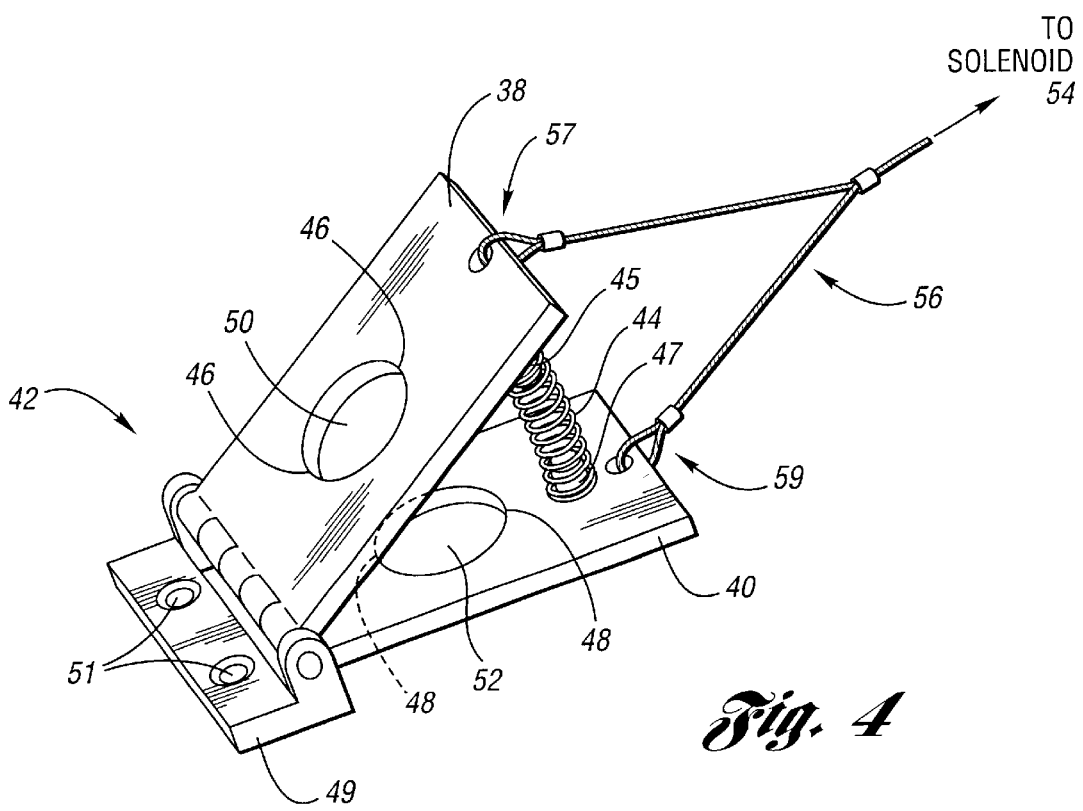
FIG. 4 is a perspective view of the friction lock shown in FIG. 1, removed from the support tube for clarity.

The curved support tubes 14, 16 are selectively locked in position by a friction lock 36, shown in detail in FIG. 4. The friction lock 36 includes first and second lock plates 38, 40 pivotally connected at a pivot joint 42, and biased away from each other by a compression spring 44. Attached to the lock plates 38, 40 are pins 45, 47 which retain the compression spring 44. The pivot point 42 includes a mounting bracket 49 which has mounting holes 51 for securing the mounting bracket 49 to a portion of the seat. Each lock plate 38, 40 includes an aperture 50, 52 formed therethrough for receiving the curved support tube 16. Each aperture 50, 52 is slightly larger than the diameter of the curved support tube 16.

Accordingly, when the lock plates 38, 40 are pivoted away from each other by the compression spring 44 to an open position, the edges 46, 48 of the apertures 50, 52 of the lock plates 38, 40 frictionally engage the sides of the curved support tube 16, thereby locking the curved support tube 16 in position. Because the support tube 14 is connected to the support tube 16 via the brace 18, both support tubes 14, 16 are effectively locked in position by the friction lock 36. In order to disengage the friction lock 36, the solenoid 54, shown in FIG. 1, pulls a cable 56 which is attached to the plates 38, 40 at connection points 57, 59. This pulls the lock plates 38, 40 together against the bias of the spring 44, to disengage the edges 46, 48 of the apertures 50, 52 of the lock plates 38, 40 from the sides of the curved support tube 16, thereby unlocking the curved support tubes 14, 16 to allow deployment of the headrest 12.

Returning to FIG. 1, the role of the friction lock 36 in the assembly 10 can be seen. When the friction lock 36 is disengaged, a tension spring 58, which is engaged between a fixed point 60 inside the seat and the brace 18, pulls the brace 18 upward to slide the curved support tubes 14, 16 along the rollers 20, 22. This moves the headrest 12 upward and forward in the vehicle to reduce the distance between the headrest 12 and the head of the vehicle seat occupant. To return the headrest 12 to the retracted position after deployment, a motor 62 and cable 64 system is used.

The motor 62 is operatively connected to the cable 64, which is connected to the brace 18. The motor 62 is operative to rotate thereby tensioning the cable 64 and pulling the brace 18, along with the curved support tubes 14, 16 and the headrest 12, downward to the retracted position after deployment. Once the friction lock 36 is engaged, the motor 62 then rotates in the opposite direction to remove the tension from the cable 64. This prepares the headrest 12 for future deployment by providing enough cable 64 so that movement of the tubes 14, 16 is unconstrained. A second tension spring 66 may be engaged with the cable 64 to take up slack in the cable 64. The spring 66 avoids sloppiness in the cable 64, which may result in the cable getting hung up on something when deployed. Alternatively, the motor 62 may include a one-way clutch to allow free wheeling movement to pay out the cable 64 to allow movement of the headrest 12 to the deployed position.

The head restraint assembly 10 also includes an impact sensor 68, which can be a simple accelerometer or other sensor capable of detecting impact. The impact sensor 68 is located in a convenient position in the vehicle, and is connected to the solenoid 54. Accordingly, in operation, when the impact sensor 68 senses an impact, the system is activated. The solenoid 54 pulls the cable 56 to unlock the friction lock 36, and the spring 58 moves the brace 18, curved support tubes 14, 16 and headrest 12 upward. The Delrin™ bearings 20, 22 provide a smooth, curved trajectory which ejects the headrest 12 forward a particular distance along a predetermined arc. If the headrest 12 senses contact before its potential full deployment, signals will be sent by a sensor 70 located in the headrest 12, to the solenoid 54 causing the solenoid to move the cable to the left, as viewed in FIG. 1. Hence, the steel lock plates 38, 40 will jam the hollow tube 16, and prevent further movement of the headrest 12. This prevents the headrest 12 from continuing its forward movement after it has already engaged the head of the vehicle occupant.

Because deployment of the headrest 12 is not dependent upon actuation of slow turning motors, but rather upon the almost instantaneous release of the spring-loaded support tubes 14, 16, the deployment of the headrest 12 occurs very rapidly. In fact, it is expected that the dynamics of the system will be completed in less than 0.2 seconds. This provides a clear advantage over prior art systems which require impacts to be anticipated, perhaps erroneously, so that the relatively slow motors have time to adjust the headrest.

Once the headrest 12 is deployed, signals may be provided to initiate retrieval of the headrest 12 to its original position. For example, the solenoid 54 will pull the lock plates 38, 40 inward, which releases the tube 16. The motor 62 then rotates to wind up the cable 64, thereby pulling the brace 18 downward. Once the brace 18 has moved down to its original position, the solenoid 54 will move the cable 56 to the left, as viewed in FIG. 1, thereby allowing separation of the lock plates 38, 40. As a result of forces provided by the compression spring 44, the lock plates 38, 40 will jam or frictionally lock the curved support tube 16.

Finally, the motor 62 will respond again and rotate to pay out cable 64 so that there is enough loose cable for the next deployment. To ensure that the loosened cable 64 is not caught on objects within the seat, the spring 66 is provided to reduce any slack. Alternatively, the motor 62 may include a one-way clutch which allows the motor to free wheel during deployment and to take up cable slack when the system is returned to the original position. Addition of the clutch would eliminate the need for the spring 66.

FIG. 5 schematically shows an alternative embodiment 72 of the present invention. A single support tube 74 is used instead of the two-tube configuration previously discussed. A solid bar 76 is adjustably positioned extending from within the hollow tube 74 in a manner to allow selective adjustment of the headrest 12 while the hollow tube 74 remains stationary. The tube 74 has grooves 78 which are used to engage a ratchet-type stopping mechanism 80, shown in detail in FIG. 5a. The ratchet stopping mechanism 80 includes a compression spring 82 disposed between a fixed object 83 and a pawl 84, which cooperates with the grooves 78 in the support tube 74 to lock the tube 74 in place. A solenoid 86 can selectively extend or retract as indicated by the arrow in FIG. 5a. The pawl 84 pivots about a pivot point 88 as the solenoid 86 extends and retracts. Thus, the support tube 74 is selectively locked and unlocked by the ratchet stopping mechanism 80, which is an alternative to the friction lock 36 discussed above. Just as in the other embodiment, the solenoid 86 is electrically connected to a vehicle impact sensor which signals it to unlock the support tube when a vehicle impact is sensed.

Returning to FIG. 5, a number of additional features of the alternative embodiment are shown. A compression spring 90 is disposed within a spring housing 92 at the base of the support tube 74. The compression spring 90 supplies the necessary force to deploy the headrest 94 when the ratchet mechanism 80 unlocks the support tube 74. The support tube 74 pilots on ball bearings 96, 98 during deployment of the headrest 94, and an electric motor 100 is operative to pull the support tube 74 and headrest 94 back to the retracted position after deployment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat and headrest assembly, comprising:
a seat back;
a headrest moveably supported with respect to the seat back on a pair of curved guide tubes, said guide tubes movable along a plurality of guide elements, wherein the headrest is movable between a retracted position closely adjacent to the seat back, and an extended position extending away from the seat back and forwardly toward the head of a seated occupant; and
wherein the headrest has a deployment mechanism biasing the headrest in an upward direction for deploying the headrest from the retracted position to the extended position, and includes a locking device for selectively locking at least one of the guide tubes in order to allow the headrest to move in a desired vertical position, said locking device being disengageable in the event of a vehicle impact to allow rapid movement of the headrest to the extended position.

2. The vehicle seat and headrest assembly of claim 1, wherein the locking device comprises a friction lock having first and second lock plates pivotally connected at a closed end and biased away from each other at an open end by a compression spring, each lock plate having an aperture formed therethrough for receiving one of the guide tubes.

3. The vehicle seat and headrest assembly of claim 1, wherein the locking device comprises a ratchet mechanism including a spring loaded pawl capable of cooperating with teeth formed in one of the guide tubes.

4. The vehicle seat and headrest assembly of claim 1, further comprising a solenoid operatively connected to the locking device for selectively locking and disengaging the locking device.

5. The vehicle seat and headrest assembly of claim 4, further comprising a vehicle impact sensor electrically connected to the solenoid for signaling the solenoid to disengage the locking device when a vehicle impact is sensed.

6. The vehicle seat and headrest assembly of claim 4, further comprising an occupant sensor disposed within the headrest and electrically connected to the solenoid for signaling the solenoid to lock the locking device when the occupant's head contacts the headrest.

7. The vehicle seat and headrest assembly of claim 1, wherein each guide tube comprises a hollow outer tube and a solid bar disposed within the outer tube for adjusting the headrest to the height of the occupant's head.

8. The vehicle seat and headrest assembly of claim 1, further comprising a brace for connecting the curved guide tubes.

9. The vehicle seat and headrest assembly of claim 8, wherein the deployment mechanism includes a tension spring disposed between the brace and an object within the seat.

10. The vehicle seat and headrest assembly of claim 8, further comprising a motor for continuously tensioning a cable connected to the brace until the headrest is returned to the retracted position.

11. The vehicle seat and headrest assembly of claim 10, wherein the motor further comprises a clutch for removing the tension from the cable during deployment of the headrest.

12. The vehicle seat and headrest assembly of claim 1, wherein the deployment mechanism includes a compression spring disposed within a spring housing at one end of one of the guide tubes.

13. The vehicle seat and headrest assembly of claim 1, wherein the guide elements comprise rollers.

14. The vehicle seat and headrest assembly of claim 1, wherein the occupant sensor includes a photographic cable.

15. The vehicle seat and headrest assembly of claim 1, wherein the occupant sensor includes an electronic sensor.

16. A vehicle seat and headrest assembly, comprising:

a seat back;

a headrest movable between a retracted position closely adjacent to the seat back, and a deployed position extending away from the seat back and forwardly toward the head of a seated occupant;

first and second curved support tubes connected to each other by a brace and connected to the headrest for supporting the headrest and moving it between the retracted position and the deployed position;

a plurality of guide elements for supporting the support tubes and for piloting their movement while they move the headrest;

a tension spring having a first end connected to a portion of the seat and a second end connected to the brace for moving the support tubes to deploy the head rest; and a friction lock for selectively locking the first support tube thereby stopping movement of the headrest, and releasing the first support tube thereby facilitating movement of the headrest.

17. The vehicle seat and headrest assembly of claim 16, further comprising a solenoid operatively connected to the friction lock for controlling the locking and releasing of the first support tube.

18. The vehicle seat and headrest assembly of claim 17, further comprising a vehicle impact sensor electrically connected to the solenoid for signaling the solenoid to operate the friction lock to release the first support tube when a vehicle impact is sensed.

19. The vehicle seat and headrest assembly of claim 16, further comprising a cable disposed between the brace and a motor capable of tensioning the cable for returning the headrest to the retracted position after deployment.

20. The head restraint assembly of claim 19, wherein the motor further comprises a clutch for selectively allowing the motor to provide rotational resistance when tensioning the cable and to freewheel during deployment of the headrest.

21. A vehicle seat and headrest assembly, comprising:

a seat back;

a headrest capable of being deployed upward and toward an occupant from a retracted position to a deployed position;

a curved support member connected to the headrest for supporting the headrest and for selectively moving the headrest between the retracted and the deployed positions;

a plurality of guide elements for carrying the support member and for piloting its movement during movement of the headrest;

a spring deployment mechanism for deploying the headrest;

a friction lock having a closed position for locking the support member thereby stopping deployment of the headrest, and an open position for releasing the support member thereby facilitating deployment of the headrest;

a solenoid operatively connected to the friction lock for selectively opening and closing the friction lock;

a vehicle impact sensor electrically connected to the solenoid for signaling the solenoid to open the friction lock when a vehicle impact is sensed; and an occupant sensor electrically connected to the solenoid and disposed within the headrest for signaling the solenoid to close the friction lock when the occupant's head contacts the headrest.

22. The vehicle seat and headrest assembly of claim 21, wherein the guide elements comprise ball bearings.

* * * * *